United States Patent Office 2,891,352
Patented June 23, 1959

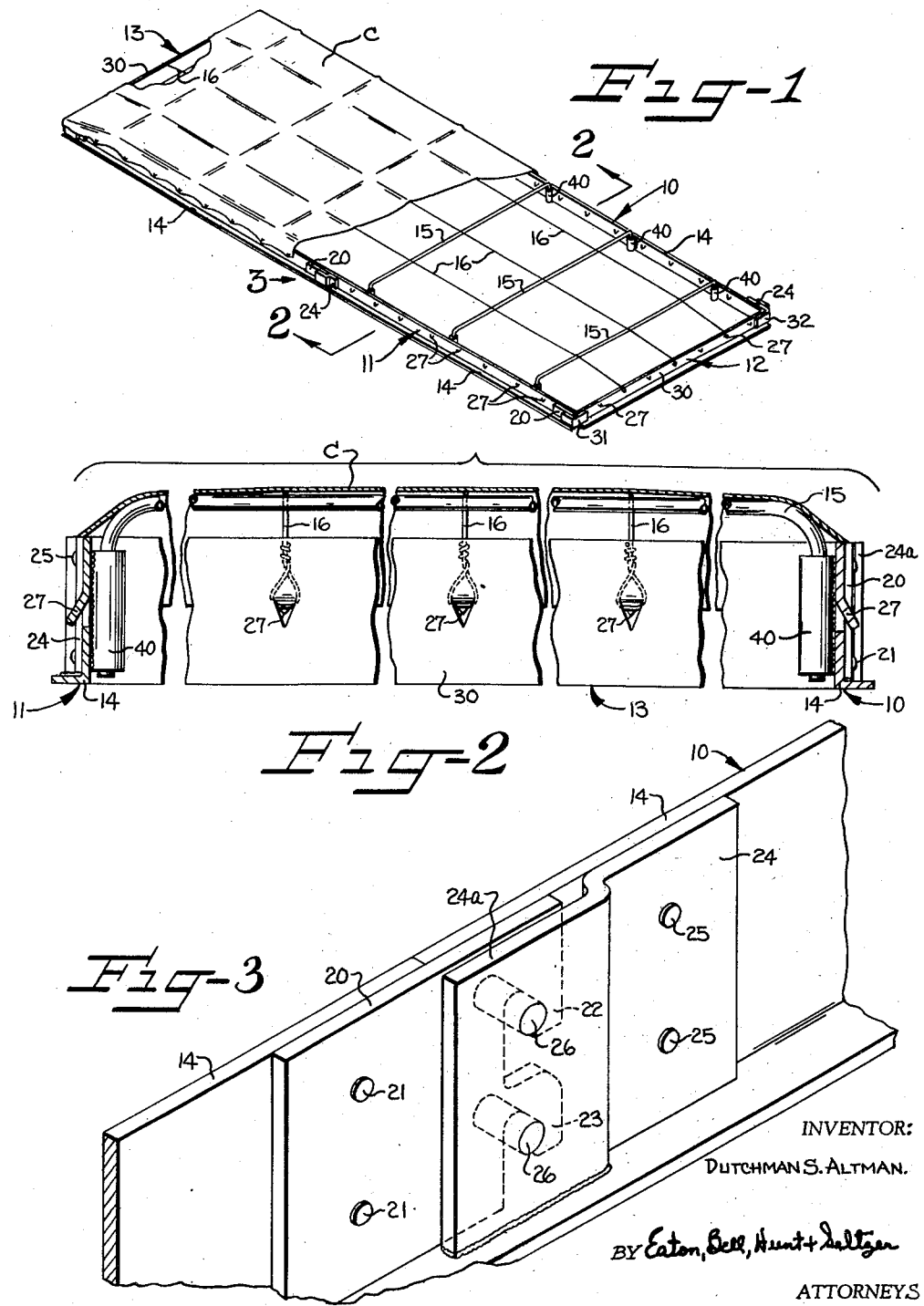

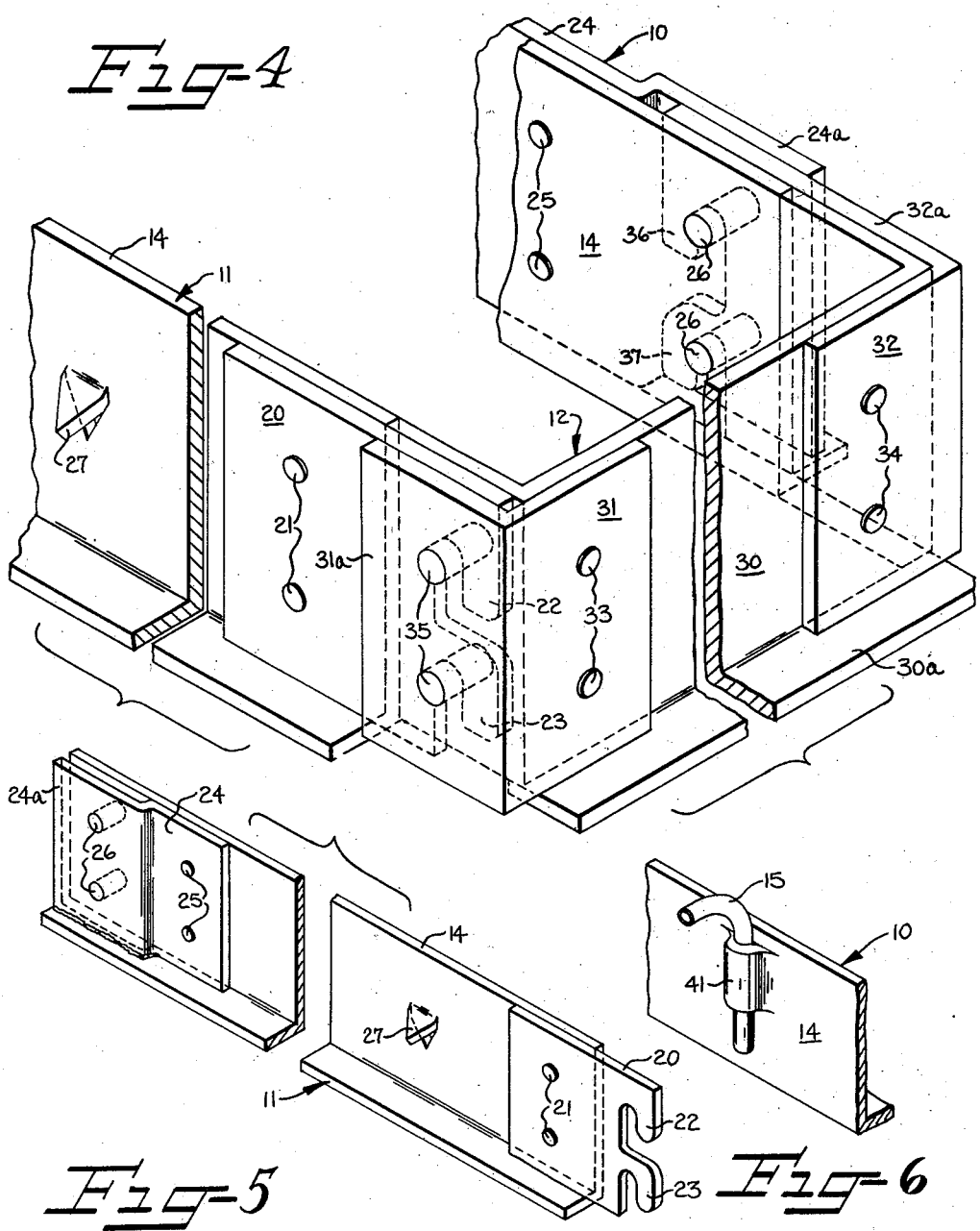

2,891,352

PLANT BED ENCLOSURE

Dutchman S. Altman, Johnsonville, S.C.

Application May 1, 1956, Serial No. 582,031

6 Claims. (Cl. 47—29)

This invention relates to protecting devices for plants and the like and, more particularly, to an enclosure for a tobacco plant bed.

In former days when the forests were not encroached upon like they are today by open fields and before the advent of gassing to kill weed seeds, the tobacco farmer would go far into the woods away from the weeds growing in the open fields and select a suitable place for a plant bed, preferably besides a branch which would afford a supply of water for the plant bed. Sufficient wood would then be cut and assembled and burned on the plant bed spot for almost an entire day to kill the few weed seeds present.

Under present day standards and the encroachment of agriculture upon forests, this has become practically impossible and tobacco growers are resorting more frequently to preparing the soil adjacent the house or any convenient spot nearby by placing an airtight or nearly airtight enclosure around soil that has been plowed or spaded and emitting the gas thereto which will permeate the loose soil and kill all of the weed seeds therein.

It is a primary object of this invention to provide a lightweight enclosure having a framework made preferably of aluminum, magnesium or other nonferrous material, which the tobacco grower can use to enclose a plant bed after it has been worked to a depth of about eight inches and wherein a translucent and airtight cover of, preferably, plastic material covers the framework to permit gas to be emitted inside the enclosure wherein the cover and framework confine the gas to cause it to permeate the soil and kill the weed seeds and thus obviate the necessity of burning the soil.

It is, of course, evident that the practically airtight cover could be left on the bed indefinitely, but sufficient air would probably not get to the bed to allow proper germination of all the seeds and growth of the plants, so it is preferable that after the seeds have been sown that the plant bed be covered with a cheese cloth, sometimes referred to as a canvas, which would allow entrance of the rays of the sun to assist in the germination and growth of the plants and, at the same time, allow circulation of the air to the plant bed. If desired, during a very cold period, when the plants might be damaged by the frost, the cheese cloth covering could be removed and the airtight translucent covering material temporarily installed.

It is another object of this invention to provide an enclosure for a plant bed which, in addition to serving to confine gas to treat the soil before the seeds are sown, also serves to prevent insects or the like from entering the plant bed during the growth of the plants.

It is a more specific object of this invention to provide a plant bed enclosure wherein the side walls of the enclosure are formed from elongated members adapted to be interconnected with each other and wherein each of the elongated members have identical locking means to readily permit the members to be interchanged with each other which also permits the enclosure to be made of any desired length.

It is a further object of this invention to provide a plant bed enclosure having a substantially rectangularly-shaped framework having a plurality of transversely disposed ribs extending above the sides of the framework, which ribs serve as a support for the covering to maintain the covering out of engagement with the growing plants and wherein means are provided along the sides and ends of the framework for engaging edge portions of the covering to permit the covering to be positioned on the framework in a taut condition whereby the upper edges of the framework engage the covering and act as a seal to prevent insects or the like from crawling into the confines of the enclosure.

Some of the objects of the invention having been stated, other objects will appear as the description proceeds when taken in connection with the accompanying drawings, in which—

Figure 1 is a perspective view of the plant bed enclosure with portions of the cover removed for purposes of clarity;

Figure 2 is an enlarged vertical sectional view taken along line 2—2 of Figure 1, with parts broken away;

Figure 3 is an enlarged fragmentary perspective view looking in the direction of arrow 3 in Figure 1;

Figure 4 is an enlarged perspective view with parts removed and portions broken away showing one end of the plant bed enclosure;

Figure 5 is a perspective view with parts broken away and showing the elongated member for forming the sides of the enclosure;

Figure 6 is a fragmentary perspective view showing a modified support for the transversely disposed ribs.

Referring more specifically to the drawings, and more particularly to Figure 1, it will be observed that the plant bed enclosure comprises a substantially rectangular framework having side members 10, 11 and end members 12, 13. Each of the side members 10, 11 are formed from a plurality of elongated members 14 (Figure 5) provided with means for interconnecting each other. A plurality of spaced apart transversely disposed supporting ribs 15 extend above the framework with their opposite down-turned ends connecting the side walls 10 and 11 to support a cover C preferably formed from a transparent or translucent plastic material.

A plurality of wires 16 extend longitudinally of the frame above the supporting ribs 15 with their opposite ends suitably connected to the end walls 12 and 13. Suitable means are provided for securing the edge portions of the cover tightly to the sides and ends of the framework to prevent insects or the like from crawling up the sides or end walls and entering the plant bed. It is apparent that the plastic covering could be left on the bed indefinitely but sufficient air would probably not get to the bed to allow germination of the seed or growth of the plants so it is preferable that after the seed has been sown that the plant bed be covered with a cheese cloth which will allow the sun's rays to assist in the germination and growing and at the same time allow circulation of air to the bed.

Referring now to Figure 5, one of the elongated members 14 for forming the side walls is shown. The member 14 is preferably formed from angle aluminum having a vertically and horizontally disposed flange and secured to the vertical flange at one end of the member is a bracket 20, by suitable means such as rivets 21. The bracket 20 has upper and lower hooks 22, 23 respectively extending outwardly from the end of the member 14 to permit the hooks to be lockingly engaged with an adjoining member.

The opposite end of the member 14 is provided with a substantially S-shaped plate or bracket 24 secured thereto as by rivets 25. The bracket 24 has an off-set portion 24a spaced from the vertical flange of the member 14 to provide a slot for the hooks 22, 23 of an adjoining member 14 to be received therebetween and engage transversely disposed spaced apart studs or rods 26 which are suitably secured to the vertical flange of member 14 and the off-set portion 24a. At spaced intervals along the vertical flange of each of the elongated members 14 are provided hook-like members 27 formed by punching portions of the vertical flange outwardly from the member 14.

The end wall members 12, 13 are identical to each other and comprise a U-shaped member 30 having a horizontal flange 30a extending outwardly from the lower end thereof. L-shaped angle plates 31, 32 are suitably secured to the opposite corners of the member 30 as by rivets 33, 34, respectively. It should be noted that the angle plate 31 has a side portion 31a spaced from the outer surface of the U-shaped member 30 to provide a slot therebetween for reception of the hooks 22, 23 of the member 14 when the same is moved into locking engagement with spaced apart transverse studs 35 which are suitably secured to the members 30 and 31.

The angle plate 32 at the other end of the U-shaped member 30 is provided with a side portion 32a which extends inwardly about twice the distance from the corner as the side portion 31a of the member 31. Upper and lower hooks 36, 37 are provided on the outer end of the side portion 32a to lockingly engage the spaced apart studs 26 on the adjacent elongated member 14.

Vertically disposed tubular members 40 are suitably secured as by welding to the inner surface of the members 14 in spaced apart relation in which are received the opposite down-turned ends of the supporting ribs 15 which support the cover C, as shown in Figure 2. In Figure 6 is illustrated a modified form of rib supporting means wherein in lieu of separate tubular members 40 being welded to the inner surface of the members 14, sufficient material has been punched inwardly from the members 14 to form tubular members 41 which support the lower down-turned ends of the ribs 15.

It should be noted that the ribs 15 are so bent at opposite ends that the upper portion of the down-turned ends are curved which curvature acts as a stop by engaging the members 40 or 41 to maintain the ribs above the upper edges of the side and end walls to provide sufficient height for the growth of the plants in the enclosure.

To assemble the framework to surround and protect a plant bed, the members 14 are connected together to form the sides of the framework. It is, of course, apparent, that although two members 14 are shown for forming the sides 10 and 11 of the enclosure, that the enclosure may employ as many or as few members 14 as are needed to enclose the length of the plant bed.

It should be observed that the members 14 forming the side wall 10 are connected together with hook end portions 22, 23 facing in an opposite direction from the hook members 22, 23 forming the side wall 11. This reversing of the members 14 for opposite sides of the frame is necessary in order to position the side walls in proper location to be received by the hooks 36, 37 on one end of each of the end members 12, 13 and to position the hooks 22, 23 of the members 14 to be received by the studs 35 on the other end of each end member.

With the framework in assembled position, the supporting ribs or rods 15 are positioned with their down-turned ends in frictional engagement with the tubular guides or supports 40. Now, the wires 16 are stretched above the supporting ribs or rods 15 with their opposite ends suitably secured to the end members 12, 13. To complete the enclosed frame, the cover C is draped over the ribs 15 with its depending edges engaged by the hooks 27 to thus provide an enclosure for a plant bed that will prevent bugs, insects or the like from getting to the plants and damaging the same and to provide a substantially airtight enclosure for gassing the soil in the plant bed to destroy weed seed.

In the drawings and specification there has been set forth a preferred embodiment of the invention and, although specific terms are employed, they are used in a generic and descriptive sense only and not for purposes of limitation, the scope of the invention being defined in the claims.

I claim:

1. An enclosure for a plant bed to confine a gas therein for treating the soil of the plant bed, said enclosure comprising a substantially rectangular-shaped framework having opposed side walls and end walls, each of said side walls having at least one elongated member identical with respect to the corresponding elongated member of the other side wall, at least one hook extending outwardly from one end of each of said elongated members, said elongated members each having a slot formed in the other end, at least one transversely disposed stud positioned in each of said slots, said end walls each comprising a U-shaped member having a slot formed in one end thereof, at least one transversely disposed stud positioned in each slot for receiving the corresponding hook of the adjacent elongated member, at least one hook provided on the other end of each of said U-shaped end members for reception by the stud in the slot on the end of an adjacent elongated member, a plurality of supporting ribs extending above said framework and having down-turned opposite ends, means provided on the inner surfaces of said side walls for receiving the down-turned ends of said supporting ribs, a substantially impervious cover resting on said ribs and having its edges extending downwardly along the side and end walls, and spaced apart means provided on said side and end walls for engaging the edges of the cover whereby the cover may be positioned in a taut manner over the framework with the upper edges of the framework engaging the cover to act as a seal to prevent the gas from escaping from the enclosure.

2. An enclosure device according to claim 1 wherein said spaced apart means for engaging the edges of the cover are integral with the side and end walls and comprise punched-out hooks.

3. An enclosure according to claim 1 wherein said means for receiving the down-turned ends of said ribs comprises vertically disposed tubular members secured to the inner surfaces of the side walls.

4. An enclosure according to claim 1 wherein said means for receiving the down-turned ends of said ribs comprises inwardly bowed side wall portions for slidably engaging and confining the down-turned ends.

5. An enclosure for a plant bed comprising a substantially rectangular-shaped framework having opposed side walls and end walls, each of said side walls being formed from a plurality of identical elongated members, at least one hook extending outwardly from one end of each of said elongated members, said elongated members each having a slot formed in the other end, at least one transversely disposed stud positioned in each of said slots for receiving the hook of an adjacent elongated member, said end walls each comprising a U-shaped member having a slot formed in one end thereof, at least one transversely disposed stud positioned in each slot for receiving the corresponding hook of the adjacent elongated member, and at least one hook provided on the other end of each of said U-shaped end members adapted to be received in the slot on the end of an adjacent elongated member.

6. In an enclosure for a plant bed comprising a substantially rectangular-shaped framework having opposed side walls and end walls, wherein said side walls are formed from a plurality of identical elongated members; each of said elongated members comprising a horizontally disposed base and a vertical flange extending upwardly therefrom, a bracket having upper and lower hooks secured to one end of said vertical flange, a plate having an off-set portion secured to the other end of said vertical flange, said off-set portion being spaced from said vertical flange to define a slot therebetween, and upper and lower studs extending transversely in said slot between said vertical flange and said off-set portion, each of said end walls comprising a U-shaped member, a first L-shaped angle plate secured to one corner of said U-shaped member and having upper and lower hooks which extend beyond one leg of said U-shaped member, a second L-shaped angle plate secured to the other corner of said U-shaped member, said second L-shaped angle plate having a leg spaced outwardly from the other leg of said U-shaped member to define a slot therebetween, and upper and lower studs extending transversely in said last-mentioned slot between said other leg of the U-shaped member and the leg of said second L-shaped angle plate, and respective upper and lower hooks of each one of said elongated members and said end walls being received by a corresponding opposed slot formed in the adjacent one of said elongated members and said end walls in locking engagement about the upper and lower studs therein around the perimeter of said framework to thereby couple said side walls and end walls together.

References Cited in the file of this patent

UNITED STATES PATENTS

| | | |
|---|---|---|
| 379,274 | Hamilton | Mar. 13, 1888 |
| 1,904,700 | Starks | Apr. 18, 1933 |
| 1,960,001 | Davies | May 22, 1934 |
| 2,146,784 | Wilson | Feb. 14, 1939 |
| 2,582,035 | Hill | Jan. 8, 1952 |
| 2,649,102 | McDonough | Aug. 18, 1953 |

FOREIGN PATENTS

| | | |
|---|---|---|
| 215,529 | Great Britain | May 15, 1924 |
| 239,973 | Great Britain | Sept. 24, 1925 |
| 437,785 | Great Britain | Nov. 5, 1935 |
| 611,675 | Great Britain | Nov. 2, 1948 |